US011153732B2

(12) United States Patent
Ikeda et al.

(10) Patent No.: US 11,153,732 B2
(45) Date of Patent: Oct. 19, 2021

(54) APPARATUS FOR DETERMINING ARRANGEMENT OF MOBILE SHOP VEHICLES, METHOD FOR DETERMINING ARRANGEMENT, AND COMPUTER-READABLE STORAGE MEDIUM

(71) Applicant: Toyota Jidosha Kabushiki Kaisha, Toyota (JP)

(72) Inventors: Michio Ikeda, Nagoya (JP); Eiichi Ishii, Nisshin (JP); Mitsugu Makita, Nagoya (JP); Toru Yoshida, Miyoshi (JP); Gaku Itou, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 16/274,482

(22) Filed: Feb. 13, 2019

(65) Prior Publication Data
US 2019/0253851 A1    Aug. 15, 2019

(30) Foreign Application Priority Data

Feb. 14, 2018  (JP) .............................. JP2018-024409

(51) Int. Cl.
*H04W 4/44* (2018.01)
*G06F 9/30* (2018.01)
*H04W 4/23* (2018.01)

(52) U.S. Cl.
CPC ............ *H04W 4/44* (2018.02); *G06F 9/3004* (2013.01); *H04W 4/23* (2018.02)

(58) Field of Classification Search
CPC ......... H04W 4/44; H04W 4/23; G06F 9/3004; G06Q 30/0639; G06Q 30/06; G06Q 30/0205; B60P 3/0257
See application file for complete search history.

(56) References Cited

U.S. PATENT DOCUMENTS

| | | | | |
|---|---|---|---|---|
| 10,346,899 B2* | 7/2019 | Holman | ............. | G06Q 30/0633 |
| 10,366,290 B2* | 7/2019 | Wang | ................ | G06K 9/00671 |
| 10,592,959 B2* | 3/2020 | Wilkinson | ............ | G06F 16/288 |
| 10,664,852 B2* | 5/2020 | DeLuca | .................. | H04L 67/18 |
| 10,860,620 B1* | 12/2020 | Martel | .................... | G06F 16/26 |
| 2006/0026081 A1* | 2/2006 | Keil | ................... | G06Q 30/0202 |
| | | | | 705/7.32 |
| 2012/0116861 A1* | 5/2012 | Dobyns | ................ | H04B 7/0404 |
| | | | | 705/14.34 |
| 2013/0054012 A1* | 2/2013 | Holman | ................. | G06Q 50/22 |
| | | | | 700/232 |
| 2013/0054367 A1* | 2/2013 | Grigg | ................. | G06Q 30/0207 |
| | | | | 705/14.58 |

(Continued)

FOREIGN PATENT DOCUMENTS

JP          2010143558 A         7/2010

*Primary Examiner* — Michael Won
(74) *Attorney, Agent, or Firm* — Dinsmore & Shohl LLP

(57) ABSTRACT

The present disclosure makes it possible to properly arrange mobile shop vehicles. An apparatus for determining arrangement of mobile shop vehicles comprises a controller configured to set a user of a shop group formed by the plurality of mobile shop vehicles; and determine the arrangement of the plurality of mobile shop vehicles on the basis of information that represents at least one of an attribute, a taste, and a purchase history of the user.

7 Claims, 17 Drawing Sheets

(56) References Cited

U.S. PATENT DOCUMENTS

| | | | | |
|---|---|---|---|---|
| 2013/0054368 A1* | 2/2013 | Grigg | ...................... | G06Q 30/02 |
| | | | | 705/14.58 |
| 2015/0201160 A1* | 7/2015 | Polyakov | ........... | H04N 5/23206 |
| | | | | 348/14.03 |
| 2016/0009451 A1* | 1/2016 | Ticktin | ..................... | B65D 1/02 |
| | | | | 206/459.5 |
| 2017/0308851 A1* | 10/2017 | Beach-Drummond | ....................... | |
| | | | | G06Q 30/0635 |
| 2018/0053369 A1* | 2/2018 | High | .................. | G01C 21/3605 |
| 2018/0155129 A1* | 6/2018 | Lagziel | ................ | B56G 1/1373 |
| 2018/0189725 A1* | 7/2018 | Mattingly | ............ | G05D 1/0088 |
| 2018/0246513 A1* | 8/2018 | Cronin | ................... | G07F 9/002 |
| 2018/0247330 A1* | 8/2018 | Duerr | ...................... | H04L 67/18 |
| 2018/0357563 A1* | 12/2018 | Kurian | ................ | H04L 63/1416 |
| 2019/0310611 A1* | 10/2019 | Jain | ........................ | B25J 9/1661 |
| 2019/0347703 A1* | 11/2019 | Bleicher | ................ | A61B 5/107 |
| 2020/0117217 A1* | 4/2020 | Yuzawa | .............. | G05D 1/0212 |
| 2020/0234573 A1* | 7/2020 | Fujii | .................. | G06K 9/00791 |
| 2020/0311677 A1* | 10/2020 | Ikeuchi | ............ | G06Q 10/08355 |
| 2020/0334628 A1* | 10/2020 | Goldberg | ............. | G06K 9/6267 |

* cited by examiner

| Season | Day of week | Time zone | Target | Shop construction | Overall shape |
|---|---|---|---|---|---|
| Spring | Monday to Friday | Forenoon | Aged | | |
| | | Midday | Twenties to thirties | | |
| | | Afternoon | Person with child | | |
| | | Night | Thirties to fifties | | |
| | Saturday /Sunday & National holiday | Forenoon | Single person | | |
| | | Midday | Person with family | | |
| | | Afternoon | | | |
| | | Night | | | |
| Summer | Monday to Friday | | | | |
| | Saturday /Sunday & National holiday | | | | |
| Autumn | Monday to Friday | | | | |
| | Saturday /Sunday & National holiday | | | | |
| Winter | Monday to Friday | | | | |
| | Saturday /Sunday & National holiday | | | | |

Fig. 4

| Target | Attribute | | | Taste | | Purchase history | |
|---|---|---|---|---|---|---|---|
| | Distinction of sex | Age bracket | Arrangement area | Shop type | Shop attribute | Purchase history | Shop attribute |
| Aged | Male | Sixty-five to seventy-five | Front | | | | |
| | | Not less than seventy-five | Front | | | | |
| | Female | Sixty-five to seventy-five | Back | | | | |
| | | Not less than seventy-five | Back | | | | |

Fig. 5

| Vehicle ID | Classification | Shop ID | Shop type | Shop attribute | Overall rank order | Classification rank order | Evaluation score | Number of word-of-mouth communications |
|---|---|---|---|---|---|---|---|---|
| V1 | Shop | S001 | Food | | | | | |
| V2 | Shop | S002 | Daily commodities | | | | | |
| V3 | Shop | S003 | Dressing | | | | | |
| V4 | Shop | S004 | Miscellaneous goods | | | | | |
| VV1 | Non-shop | NS001 | Toilet | | | | | |
| . | | | | | | | | |

Fig. 6

APPARATUS FOR DETERMINING ARRANGEMENT OF MOBILE SHOP VEHICLES, METHOD FOR DETERMINING ARRANGEMENT, AND COMPUTER-READABLE STORAGE MEDIUM

CROSS REFERENCE TO RELATED APPLICATION

This application claims the benefit of Japanese Patent Application No. 2018-24409, filed on Feb. 14, 2018, which is hereby incorporated by reference herein in its entirety.

BACKGROUND

Technical Field

The present disclosure relates to an apparatus for determining arrangement of mobile shop vehicles, a method for determining arrangement, and a computer-readable storage medium.

Description of the Related Art

It has been suggested that a vehicle is utilized as a mobile type shop or an exhibition place (Patent Document 1). It is conceived that such mobile shop vehicles are collected in an open space to build up a shopping mall (commercial complex). The shopping mall as described above is constructed by the mobile shop vehicles, and hence such an advantage is obtained that the arrangement of shops can be flexibly changed.

PRECEDING TECHNICAL DOCUMENT

Patent Document

[Patent Document 1]
Japanese Patent Application Laid-Open No. 2010-143558

SUMMARY

The shopping mall, which is formed by the mobile shop vehicles, can flexibly change the arrangement of shops. Therefore, it is considered that the sales volume and/or the ability to attract customers can be improved by changing the arrangement. However, in the case of the conventional technique, no investigation is performed in relation to the arrangement of shops, and it has been difficult to determine what arrangement of shops is adequate.

The present disclosure has been made taking the foregoing problem into consideration, an object of which is to provide a technique that makes it possible to provide a proper arrangement of mobile shop vehicles.

A first aspect of the present disclosure resides in an apparatus for determining arrangement of mobile shop vehicles. The arrangement determining apparatus comprises a controller configured to set a user of a shop group formed by the plurality of mobile shop vehicles; and determine the arrangement of the plurality of mobile shop vehicles on the basis of information that represents at least one of an attribute, a taste, and a purchase history of the user.

The user may be either a specified person or an unspecified person belonging to a group or a category having a predetermined attribute or a taste. Further, it does not matter whether or not the user really exists. Further, the attribute and the taste may be based on either a knowledge which is obtained on the basis of any rule of thumb and/or any actual value, or a knowledge which is obtained as a result of any questionnaire or a result of any deep learning or any analysis of big data.

According to the arrangement determining apparatus concerning the present disclosure, it is possible to enhance the power to appeal to customers in relation to the product (merchandise) purchase and the service utilization by the user, and it is possible to improve the sales volume and the ability to attract customers by the arrangement determination of the mobile shop vehicles on the basis of at least one of the attribute, the taste, and the purchase history of the user. That is, it is possible to adequately arrange the mobile shop vehicles.

The arrangement of the mobile shop vehicles includes the combination of shops (merchandise assortment of various merchandises and services) provided by the plurality of mobile shop vehicles for forming the shop group, as well as the overall arrangement shape of the plurality of mobile shop vehicles for forming the shop group and the relative positions of the individual mobile shop vehicles in the overall arrangement shape.

In relation to the arrangement determining apparatus according to the present disclosure, the controller may further determine the arrangement of the plurality of mobile shop vehicles on the basis of information that represents a reputation concerning the plurality of mobile shop vehicles. It is possible to enhance the power to appeal to customers, and it is possible to improve the sales volume and the ability to attract customers by the arrangement corresponding to the reputation. The information, which indicates the reputation, is, for example, the ranking (rank order) concerning the shop, the evaluation value, and the number of word-of-mouth communications. The ranking (rank order) may be either a ranking directed to a plurality of shops or a ranking directed to shops which deal with the same kind of merchandises and/or services.

In relation to the arrangement determining apparatus according to the present disclosure, the controller may determine the arrangement of the plurality of mobile shop vehicles depending on a predetermined period classification. It is possible to enhance the power to appeal to customers, and it is possible to improve, for example, the sales volume and the ability to attract customers by the determination of the arrange corresponding to the period classification. The period classification is, for example, the season, the day of the week, the ordinary day or the holiday, or the time zone in one day. It does not matter whether the time is long or short. The number of period classifications can be appropriately set. Further, it is also allowable to combine a plurality of period classifications.

In relation to the arrangement determining apparatus according to the present disclosure, the controller may determine arrangement of at least one mobile non-shop vehicle to be arranged together with the plurality of mobile shop vehicles for forming the shop group. The mobile non-shop vehicle functions, for example, as an accompanying facility for providing a service other than that of the shop, including, for example, a toilet, a vending machine, a first-aid room, and a resting room. By doing so, it is possible to raise the value as the commercial facility including the shop group. The position, at which the mobile non-shop vehicle is arranged, is, for example, a position belonging to a predetermined distance range from the place at which the concentration of predetermined shops and/or people is scheduled.

In relation to the arrangement determining apparatus according to the present disclosure, the controller may generate movement control information for the plurality of mobile shop vehicles respectively depending on the arrangement of the plurality of mobile shop vehicles; and supply the movement control information to the plurality of mobile shop vehicles respectively. By doing so, the respective mobile shop vehicles can autonomously move so that the shop group is formed.

A second aspect of the present disclosure resides in a method for determining arrangement of mobile shop vehicles, comprising setting a user of a shop group formed by the plurality of mobile shop vehicles; and determining the arrangement of the plurality of mobile shop vehicles on the basis of information that represents at least one of an attribute, a taste, and a purchase history of the user.

A third aspect of the present disclosure resides in a computer-readable storage medium. The computer-readable storage medium stores a program to allow a computer to execute a step of setting a user of a shop group formed by a plurality of mobile shop vehicles; and a step of determining the arrangement of the plurality of mobile shop vehicles on the basis of information that represents at least one of an attribute, a taste, and a purchase history of the user.

According to the present disclosure, it is possible to properly arrange the plurality of mobile shop vehicles for forming the shop group.

BRIEF DESCRIPTION OF THE DRAWINGS

FIG. 4 shows an exemplary data structure of a first table.

FIG. 5 shows an exemplary data structure of a second table.

FIG. 6 shows an exemplary data structure of a third table.

DESCRIPTION OF THE EMBODIMENTS

An explanation will be made below with reference to the drawings about the method for determining the arrangement of the mobile shop vehicles, the determining apparatus, and the program according to an embodiment of the present disclosure. The construction of the embodiment is shown by way of example, and the present disclosure is not limited to the construction of the embodiment.

Outline of System

Figure 1:
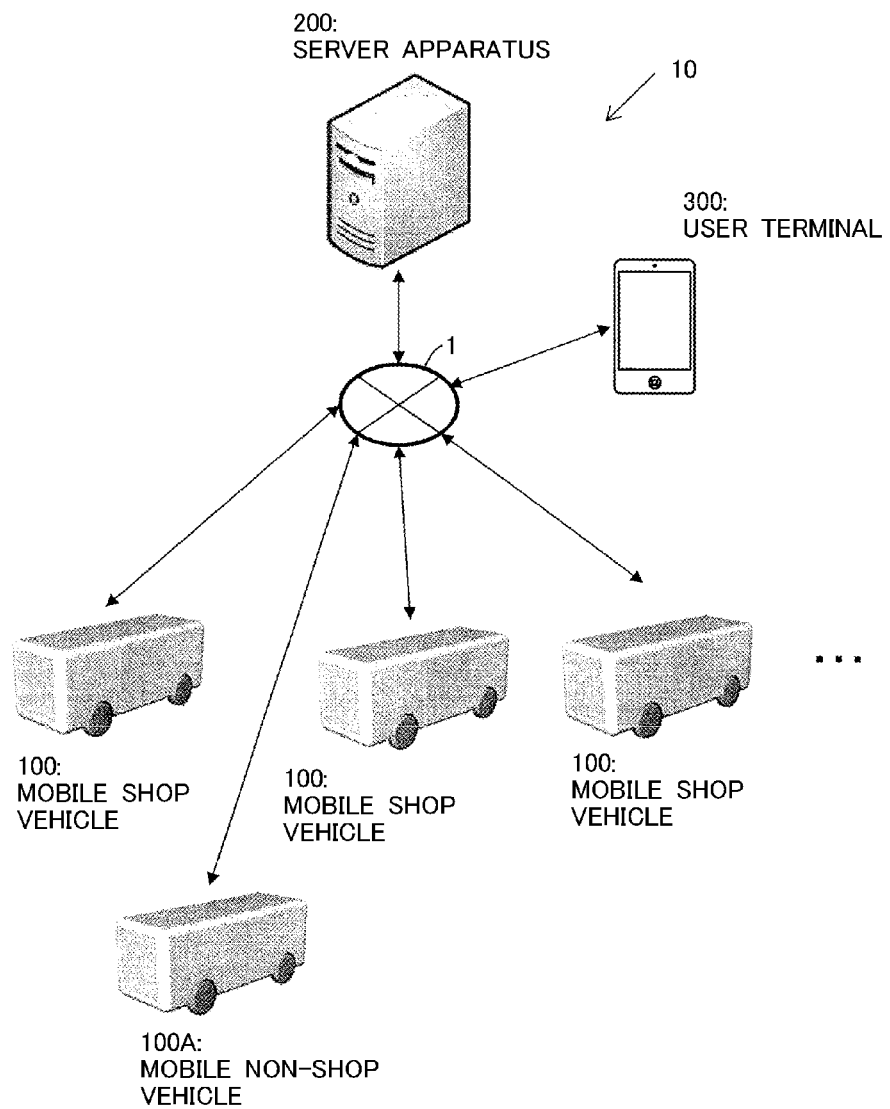
FIG. 1 explains the outline of a control system for mobile shop vehicles.
Figure 2:
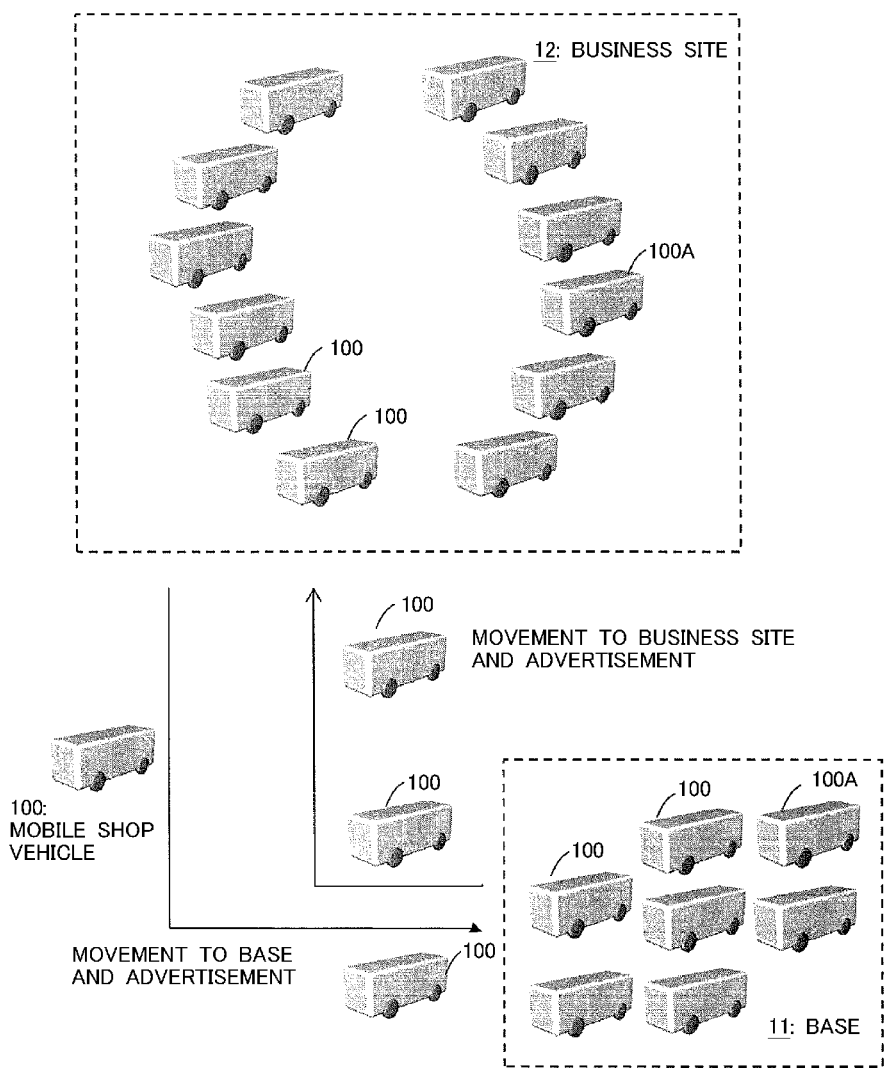
FIG. 2 shows an exemplary operation mode of the mobile shop vehicles.

An explanation will be made below about a control system for controlling mobile shop vehicles concerning a shopping mall (commercial complex) including a shop group formed by collecting the plurality of mobile shop vehicles. FIG. 1 explains the outline of the control system for the mobile shop vehicles. FIG. 2 shows an exemplary operation mode of the mobile shop vehicles. The control system 10 for the mobile shop vehicles includes the plurality of mobile shop vehicles 100 capable of making communication via a network 1, at least one mobile non-shop vehicle 100A, and a user terminal 300.

The network 1 is, for example, a public telecommunication network such as the internet or the like, for which it is possible to adopt a communication network (telecommunication network) such as WAN (Wide Area Network) and so forth. Further, the network 1 may include a cellular communication network such as 3G, LTE (Long Term Evolution) and the like, and a wireless network such as wireless LAN (including Local Area Network: WiFi (trade name)) and the like.

A server apparatus 200 manages the movement (operation) of the mobile shop vehicles 100 and the mobile non-shop vehicles 100A, and the customers (users) of the shopping mall. The user terminal 300 is a terminal device possessed by the user.

The mobile shop vehicle 100 is a multipurpose moving body which can possess a different function for every individual. In this embodiment, the mobile shop vehicle 100 is a vehicle which can move on the road. The mobile shop vehicle 100 has, in the vehicle, the facility/equipment for shop business. The mobile shop vehicle 100 can perform the business by developing the facility/equipment after traveling to the destination point. Note that in this disclosure, the "shop" means the facility to provide the merchandise (article) and/or the service (labor) with compensation or without compensation.

The mobile non-shop vehicle 100A is a multipurpose moving body which can possess a different function for every individual, in the same manner as the mobile shop vehicle 100. In this embodiment, the mobile non-shop vehicle 100A is a vehicle which can move on the road. However, the mobile non-shop vehicle 100A functions as a facility other than the "shop". For example, the mobile non-shop vehicle 100A functions, for example, as a toilet, a vending machine corner, a first-aid room, and a resting room. However, the mobile non-shop vehicle 100A is provided optionally.

As shown in FIG. 2, the mobile shop vehicles 100 and the mobile non-shop vehicles 100A stop at a base 11 when they are not used. At the base, those carried out are the vehicle maintenance, the redecoration of the shop, and the loading/unloading of merchandises, articles for service provision, and equipment. However, for example, the loading/unloading of cargoes may be performed at any place other than the base 11 (for example, a delivery center of merchandises or a business office or an enterprise place concerning the shop).

The plurality of mobile shop vehicles 100 and the mobile non-shop vehicles 100A start the movement from the base 11 in conformity with, for example, the business hours of the shopping mall, and they are collected at a business site (business place) 12 (open space) to function as a shop group of the shopping mall. The mobile shop vehicles 100 and the mobile non-shop vehicles 100A stop at the business office and/or the enterprise place described above in some cases before they arrive at the business site 12.

Each of the mobile shop vehicles 100 stops in a predetermined direction (orientation) at a designated stopping place in the business site 12. The plurality of mobile shop vehicles 100 stop in the predetermined directions at the designated stopping places respectively, and thus desired shop arrangement is obtained. The respective mobile shop vehicles 100 start the movement at a movement start time after the completion of business, and they return to the base 11.

The shopping mall according to the embodiment of the present disclosure includes the mobile shop vehicles 100 which are collected to form the shop group. Therefore, the shopping mall can be easily constructed at the place or in the region in which no shop exists. Further, the mobile non-shop vehicle 100A is also arranged together with the mobile shop vehicles 100. Therefore, it is possible to improve the convenience of the shopping mall formed by the mobile shop vehicles 100 by arranging the mobile non-shop vehicle 100A even in the case of the place at which there is no toilet.

Note that the place of collection of the mobile shop vehicles 100 and the mobile non-shop vehicles 100A may include the road. Further, the shop, which constructs the shopping mall, may include any shop other than the mobile shop vehicle 100 (any mobile type shop other than the vehicle or any fixed shop).

An interested party of the shopping mall (for example, a lender of the business site 12, an administrator of the shopping mall, an owner of the shop, and a manager of the mobile shop vehicle 100) has a demand, for example, to improve the sales volume and the ability to attract customers. In the case of the shopping mall formed by the mobile shop vehicles 100 and the mobile non-shop vehicles 100A, it is easy to change the arrangement of the mobile shop vehicles 100. However, it has been difficult to determine what arrangement of the shops is adequate, and it has been not easy to derive the shop arrangement capable of responding to the demand of the interested party.

An explanation will be made below about the method for determining the arrangement of the mobile shop vehicles, the determining apparatus, and the program which make it possible to change the arrangement of the mobile shop vehicles in accordance with the parameter concerning the user by determining the arrangement of the mobile shop vehicles corresponding to the parameter (for example, the attribute, the taste, and the purchase history) concerning the user of the shopping mall.

In this specification, the change of the arrangement of the plurality of mobile shop vehicles 100 includes the change of the layout of the plurality of mobile shop vehicles 100 which form the shop group. The change of the layout includes addition, change, and deletion of the mobile shop vehicle 100. The addition of the mobile shop vehicle 100 is the additional arrangement at the business site 12. The change of the mobile shop vehicle 100 includes the position replacement between the mobile shop vehicles 100 having been already arranged at the business site 12 and the replacement of a part of the mobile shop vehicles 100 having been already arranged with any mobile shop vehicle 100 not arranged yet. The deletion of the mobile shop vehicle 100 is the withdrawal of a part of the mobile shop vehicles 100 arranged at the business site 12.

Figure 3:
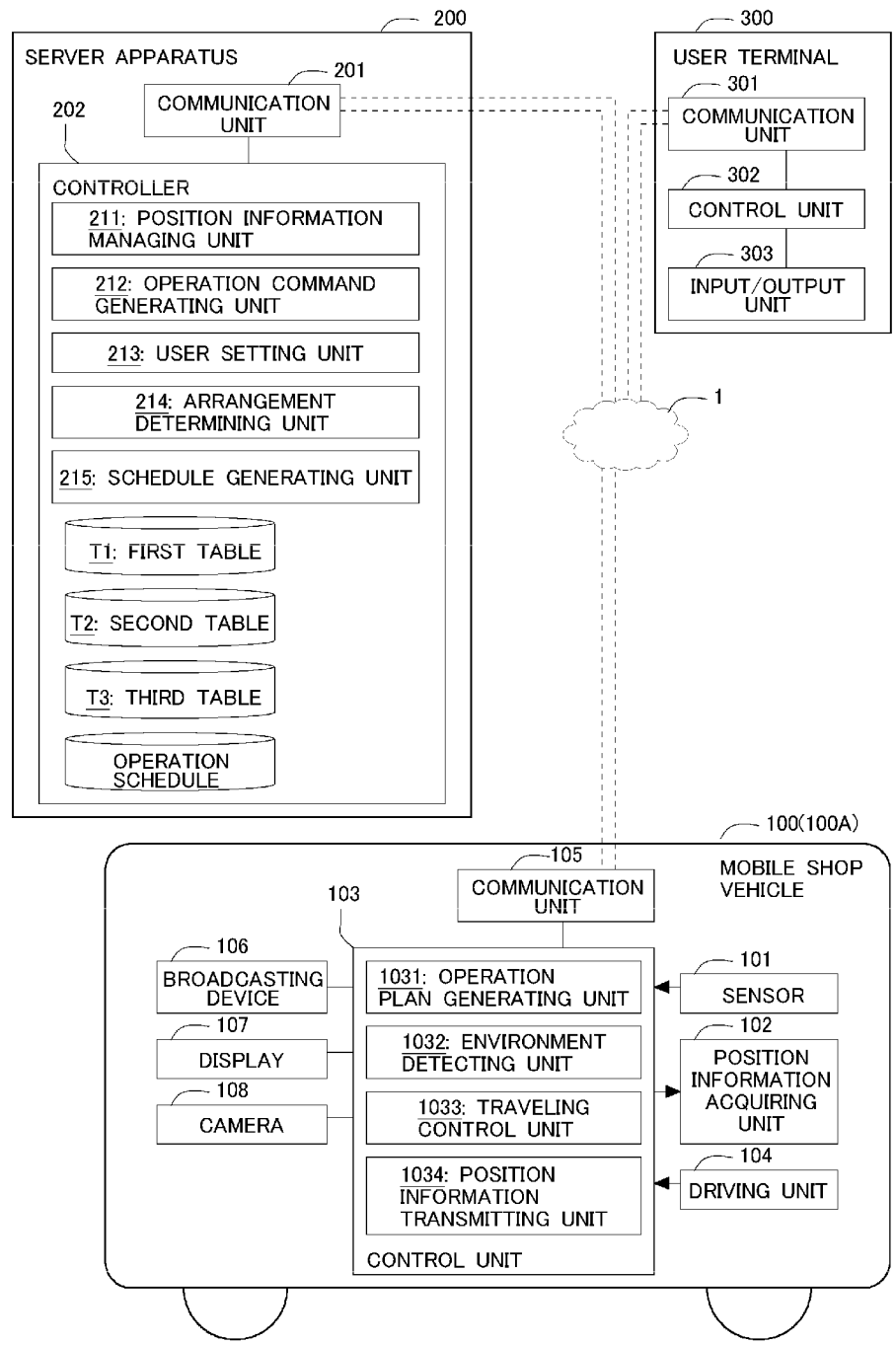
FIG. 3 shows an exemplary construction of a server apparatus, a mobile shop vehicle, a mobile non-shop vehicle, and a user terminal.

Exemplary Construction of Mobile Shop Vehicle, Mobile Non-Shop Vehicle, Server Apparatus, and User Terminal FIG. 3 shows an exemplary construction of the server apparatus 200, the mobile shop vehicle 100, the mobile non-shop vehicle 100A, and the user terminal 300.

Mobile Shop Vehicle 100, Mobile Non-Shop Vehicle 100A

The mobile shop vehicle 100 is provided with the equipment in the vehicle cabin in order to perform the shop business. However, in this specification, any explanation is omitted about the equipment for the shop business. In this section, an explanation will be principally made while being narrowed to the function as the vehicle which is commonly possessed by the plurality of mobile shop vehicles 100 and the function to provide the information for shop guidance. Further, the mobile non-shop vehicle 100A can be constructed in the same manner as the mobile shop vehicle 100 except that the equipment in the vehicle cabin is different from that of the mobile shop vehicle 100. On this account, the mobile non-shop vehicle 100A will be explained by explaining the mobile shop vehicle 100 described below.

The mobile shop vehicle 100 travels in accordance with an operation command (movement instruction) acquired from the server apparatus 200. Specifically, the traveling route is generated on the basis of the operation command acquired from the server apparatus 200 via the network 1, and the mobile shop vehicle 100 travels on the road in accordance with a method adequate for the autonomous traveling while sensing the surroundings of the mobile shop vehicle 100. For example, the mobile shop vehicle 100 is constructed to include a sensor 101, a position information acquiring unit 102, a control unit 103, a driving unit 104, a communication unit 105, a broadcasting device 106, a display 107, and a camera 108. An unillustrated battery (secondary battery) is carried on the mobile shop vehicle 100. The mobile shop vehicle 100 is operated by the electric power supplied from the secondary battery.

However, it is not necessarily indispensable that the mobile shop vehicle 100 should be unmanned. Further, the autonomous traveling is not a requirement. For example, a personnel (for example, a sales clerk or a sales staff) who provides the service to the user, a personnel for security or the like may get on the mobile shop vehicle 100. It is not necessarily indispensable that the mobile shop vehicle 100 should always perform the autonomous movement. For example, the movement may be made by manual handling or steering. The handling may be handling which is performed by any person who gets on the mobile shop vehicle 100, or the handling may be remote control in which a remote controller or the like is used. Further, the mobile shop vehicle 100 may be a gasoline vehicle or a diesel vehicle. In this embodiment, for example, such a case will be explained that the mobile shop vehicle 100 and the mobile non-shop vehicle 100A are vehicles which perform the autonomous traveling on the road.

The sensor 101 senses the state of the vehicle and sensing the surroundings of the vehicle. The sensor 101, which is usable to perform the sensing of the state of the vehicle, is exemplified by an acceleration sensor, a velocity sensor, and an azimuth angle sensor. The sensor 101, which is usable to perform the sensing of the surroundings of the vehicle, is exemplified, for example, by a stereo camera, a laser scanner, LIDAR, and a radar. The information acquired by the sensor 101 is transmitted to the control unit 103.

The position information acquiring unit 102 acquires the present position of the vehicle. Typically, the position information acquiring unit 102 is a GPS (Global Positioning System) device which determines the position information by receiving the GPS satellite signal. The position information, which is obtained from the GPS device, represents the latitude, the longitude, and the altitude. The position information acquiring unit 102 may be either a positioning device based on GNSS (Global Navigation Satellite System) other than GPS or a positioning device based on the base station positioning, provided that the present position of the vehicle can be acquired.

The communication unit 105 connects the mobile shop vehicle 100 to the network 1. For example, a network interface card (NIC, not shown) is applied as the communication unit 105. In this embodiment, the communication unit 105 can perform the communication with another apparatus (for example, the server apparatus 200) via the network 1 by utilizing a mobile communication service such as 3G (3rd Generation), LTE (Long Term Evolution) or the like.

Note that the communication unit 105 may be provided with the communication units for performing the inter-vehicle communication with another mobile shop vehicle 100 and the mobile non-shop vehicle 100A. Further, the communication unit 105 may be constructed such that the communication, which is based on the short distance (short range) wireless communication standard such as BLE (Bluetooth (trade name) Low Energy) or the like, can be utilized for the inter-vehicle communication and/or the communication with the user terminal 300.

The broadcasting device 106 includes a device which reproduces the voice by using the voice data supplied from the control unit 103, and a speaker which outputs the reproduced voice. The display 107 displays a screen based on the display control performed by the control unit 103 by using the image data. The display 107 may be either a liquid crystal display or an organic EL display. Alternatively, the display 107 may be constructed, for example, by an LED matrix.

The camera 108 is the camera which is provided on the body of the mobile shop vehicle 100. The camera 108 photographs the surroundings of the mobile shop vehicle 100 and a predetermined range in the vehicle. In this embodiment, the mobile shop vehicle 100 has the camera 108 which is carried on the vehicle. It is possible to acquire the image (still image or moving image). The number of camera or cameras 108 is not specifically limited. The number may be one or more. However, it is also allowable to install a plurality of cameras so that the front side, the back side, and the left and right sides can be photographed respectively.

The control unit 103 controls the entire mobile shop vehicle 100. The control unit 103 includes, for example, a processor which is CPU (Central Processing Unit) or the like, and a memory which stores programs. The control unit 103 is operated as an operation plan generating unit 1031, an environment detecting unit 1032, and a traveling control unit 1033 by executing the programs by the processor.

The operation plan generating unit 1031 acquires the operation command from the server apparatus 200 to generate its own operation plan. The operation command includes the information concerning the destination point to which the mobile shop vehicle 100 is directed. The operation plan generating unit 1031 calculates the movement route of the mobile shop vehicle 100 on the basis of the destination point given by the server apparatus 200 and the own position obtained by the position information acquiring unit 102, and the operation plan generating unit 1031 generates the operation plan for moving along the movement route.

The environment detecting unit 1032 detects the environment around the mobile shop vehicle 100 required for the autonomous traveling, on the basis of the data acquired by the sensor 101. The target of the detection is, for example, the number and the position(s) of lane or lanes, the number and the position(s) of other moving body (bodies) existing around the mobile shop vehicle 100, the number and the position(s) of the obstacle(s) (for example, walker, bicycle, structure, and building) existing around the mobile shop vehicle 100 itself, the structure of the road, and the road sign. However, there is no limitation thereto. The target of the detection may be anyone provided that the target is necessary to perform the autonomous traveling. For example, when the sensor 101 is a stereo camera, the object around the mobile shop vehicle 100 is detected by performing the image processing for the image data picked up thereby.

Further, it is also allowable that the environment detecting unit 1032 not only merely detects the object around the mobile shop vehicle 100 but also performs the tracking for the detected object (performs the continuous detection of the detected target). For example, it is possible to determine the relative velocity of the object from the difference between the present coordinate of the object and the coordinate of the object detected one step before. The data (hereinafter referred to as "environment data") concerning the environment around the mobile shop vehicle 100, which is detected by the environment detecting unit 1032, is transmitted to the traveling control unit 1033 described later on.

The traveling control unit 1033 generates the control command in order to control the autonomous traveling of the mobile shop vehicle 100 on the basis of the operation plan generated by the operation plan generating unit 1031, the environment data generated by the environment detecting unit 1032, and the position information of the mobile shop vehicle 100 acquired by the position information acquiring unit 102. For example, the traveling control unit 1033 generates the control command in order to allow the mobile shop vehicle 100 to travel so that the mobile shop vehicle 100 travels along a predetermined route and any obstacle does not enter a predetermined safe area provided around the center of the mobile shop vehicle 100. The generated control command is transmitted to the driving unit 104. Any known method can be adopted as the method for generating the control command in order to autonomously move the mobile shop vehicle 100.

The driving unit 104 allows the mobile shop vehicle 100 to travel on the basis of the control command generated by the traveling control unit 1033. The driving unit 104 is constructed to include, for example, a motor, an inverter, a brake, and a steering mechanism for driving wheels possessed by the mobile shop vehicle 100. For example, the motor and the brake are driven in accordance with the control command, and thus the autonomous traveling of the mobile shop vehicle 100 is realized.

The control unit 103 further functions as the position information transmitting unit 1034. The position information transmitting unit 1034 transmits the position information acquired from the position information acquiring unit 102 to the server apparatus 200 via the communication unit 105. The timing, at which the position information transmitting unit 1034 transmits the position information, can be appropriately set. For example, the position information may be transmitted at fixed intervals. Alternatively, the position information may be transmitted in conformity with any timing at which any information is transmitted to the server apparatus 200.

Further, the control unit 103 may function as a shop information transmitting unit. The information concerning the shop may be transmitted to the server apparatus 200 via the communication unit 105. The position information is transmitted while being correlated with a vehicle identifier (vehicle ID: identifier of the mobile shop vehicle 100 or the mobile non-shop vehicle 100A). Note that a shop identifier (shop ID) may be provided distinctly from the vehicle ID. Note that a part or all of the functions possessed by the control unit 103 may be realized by a logic circuit such as ASIC, FPGA or the like.

User Terminal

The user terminal 300 is used, for example, for the user to register, in the server apparatus 200, the information concerning the user and the position information of the user terminal 300. Further, the user terminal 300 is used to receive the information concerning the shopping mall, for example, from the server apparatus 200 via the network 1 so that the information is transmitted to the user or the user is informed of the information.

The user terminal 300 is a terminal having the portability (referred to as "mobile terminal") or an in-vehicle (on-board) terminal including, for example, a smart device (smart phone, smart watch, tablet terminal, wearable terminal) and a personal computer (PC). However, the user terminal 300 is not limited to the above. Any exclusively usable or general purpose terminal, which can perform the processes and the operations described later on, can be adapted to the user terminal 300.

The user terminal 300 has a communication unit 301, a control unit 302, and an input/output unit 303. Devices of the same types of those of the devices for constructing the communication unit 201 and the controller 202 of the server apparatus 200 can be applied as the communication unit 301 and the control unit 302. The input/output unit 303 includes an input device (for example, button, key, pointing device, touch panel, and microphone) and an output device (for example, display and speaker).

Server Apparatus

In this embodiment, the server apparatus 200 operates as the apparatus for determining the arrangement of the mobile shop vehicles 100 and the mobile non-shop vehicles 100A. Any exclusively usable or general purpose computer, which includes, for example, an exclusively usable server machine, a personal computer, and a work station, can be applied to the server apparatus 200. With reference to FIG. 3, the server apparatus 200 includes a communication unit 201 and a controller 202.

The communication unit 201 connects the server apparatus 200 to the network 1. For example, a network interface card (NIC, not shown) is applied as the communication unit 201. The communication unit 201 can perform the communication with other apparatuses or devices (for example, the mobile shop vehicle 100, the mobile non-shop vehicle 100A, and the user terminal 300) via the network 1 by utilizing the mobile communication service such as 3G, LTE and the like.

The controller 202 includes, for example, a processor such as CPU or the like and a memory which stores programs. The processor operates as a position information managing unit 211, an operation command generating unit 212, a user setting unit 213, an arrangement determining unit 214, and a schedule generating unit 215 by executing the programs by the processor. Further, a vehicle data base (vehicle DB), a user data base (user DB), and an arrangement data base (arrangement DB) are stored in the memory which constitutes the controller 202.

Note that the user setting unit 213 corresponds to the controller of the present disclosure, and the arrangement determining unit 214 corresponds to the controller of the present disclosure. The schedule generating unit 215 corresponds to the generating unit of the present disclosure, and the controller 202 and the communication unit 201 correspond to the supply unit of the present disclosure.

The position information managing unit 211 and the operation command generating unit 212 perform the processes concerning the autonomous traveling of the mobile shop vehicle 100 and the mobile non-shop vehicle 100A. The position information managing unit 211 collects the position information from the mobile shop vehicle 100 and the mobile non-shop vehicle 100A which are under the control of the server apparatus 200 respectively, and the position information managing unit 211 manages the position information. Specifically, the position information managing unit 211 receives the present position information from the mobile shop vehicle 100 and the mobile non-shop vehicle 100A respectively at every predetermined cycle, and the position information managing unit 211 stores the present position information. Further, the position information managing unit 211 can also collect the information which represents the present positions of the users from the user terminals 300 respectively, and the position information managing unit can store the collected information.

The operation command generating unit 212 generates the operation command to instruct the movement to the destination point on the basis of the schedule information which represents the operation schedule with respect to the mobile shop vehicle 100 and the mobile non-shop vehicle 100A respectively as determined by the schedule generating unit 215.

The information, which indicates the destination point, includes, for example, the position coordinate of the destination point, the necessity/unnecessity of stop at the destination point, the designated stop position, and the designated direction. The destination point includes the base 11, the business site 12, and other transit points. The vehicle stops at the designated position designated by the designated stop position at the base 11 and the business site 12. Further, the direction of the vehicle during the stop is designated by the designated direction in some cases. The transit point is designated by the information which indicates the necessity/unnecessity of stop depending on the purpose of the transit.

In this embodiment, every time when the mobile shop vehicle 100 and the mobile non-shop vehicle 100A arrive at the destination point, they request the server apparatus 200 to provide the operation commands concerning the next destination point respectively via the network 1. The server apparatus 200 generates the corresponding operation commands which are supplied to the request sources via the network 1. However, the following procedure is also available. That is, the operation commands, which include the information concerning a plurality of destination points (for example, the information concerning destination points for one day), are supplied via the network 1 to the mobile shop vehicle 100 and the mobile non-shop vehicle 100A respectively. The mobile shop vehicle 100 and the mobile non-shop vehicle 100A store the supplied operation commands respectively, and they perform appropriate movement to the respective destination points in accordance with the operation commands.

For example, a first table T1, a second table T2, and a third table T3 are stored in the memory which constitutes the controller 202. The user setting unit 213 sets the target (user who is the appeal target for the product (merchandise) purchase or the service utilization) of the shopping mall (shop group) by using the information stored in the first table T1.

The arrangement determining unit 214 determines the mobile shop vehicles 100 and the mobile non-shop vehicles 100A which form the shop group and the arrangement thereof, on the basis of the attribute, the taste, and the purchase history of the user as the main target. The schedule generating unit 215 generates the operation schedule (corresponding to the movement control information) of the mobile shop vehicles 100 and the mobile non-shop vehicles 100A which form the shop group, and the operation schedule is supplied to the mobile shop vehicles 100 and the mobile non-shop vehicles 100A via the network 1 respectively. Note that a part or all of the functions possessed by the controller 202 may be realized by any logic circuit such as ASIC, FPGA and the like.

Table Construction

FIG. 4 shows an exemplary data structure of the first table T1, FIG. 5 shows an exemplary data structure of the second table T2, and FIG. 6 shows an exemplary data structure of the third table T3.

The first table T1 stores the information which represents the target of the shopping mall corresponding to the period, the shop construction, and the overall shape of the shop group arrangement. In this embodiment, as for the period, the period has categories of "season", "day of the week", and "time zone of one day". In the example shown in FIG. 4, the "season" is divided into four, i.e., "spring", "summer", "autumn", and "winter". However, the number of divisions may be larger or smaller than 4. The season may be replaced with "month".

In the example shown in FIG. 4, the "days of the week" are divided into two divisions of "Monday to Friday (ordinary day)" and "Saturday/Sunday and national holiday (holiday)". However, the number of divisions may be larger than or smaller than two. The days of the week belonging to each of the divisions can be appropriately set (for example, Saturday may be dealt with as "ordinary day"). As for the time zone, for example, one day is divided into an appropriate number of divisions of, for example, "forenoon" (for example, nine o'clock to half past eleven), "midday" (for example, half past thirteen to fourteen), "afternoon" (half past fourteen to eighteen), and "night" (eighteen to time of end of business). However, the setting of time zone of one day is arbitrary as well.

The "target" indicates the group or the category of the user who requests the product (merchandise) purchase or the use of the service in the corresponding season, the day of the week, and the time zone. In the example shown in FIG. 4, for example, the aged, twenties to forties, person with child or children, single person, and person with family are exemplified as the target. However, the technique for grouping the target can be appropriately set. The setting of the target is performed on the basis of, for example, the rule of thumb having been hitherto obtained, and the data of the population distribution, the distinction of sex, and the age bracket in each of the time zones for the neighboring inhabitants around the business site 12. However, the attribute and the taste of the user, which serve as the basis for setting the target, may be found in accordance with the result of any questionnaire, the analysis of any big data, and the result of any deep learning.

The information, which represents the shop construction, includes, for example, the total number of shops for forming the shop group arranged in the time zone, the types of shops, the number of shops corresponding to the respective types, the number accompanying equipment (for example, toilet) other than the shop, and the identifiers (vehicle ID's (shop ID's are also available)) of shops (mobile shop vehicles 100) and non-shops (mobile non-shop vehicles 100A). In this embodiment, in order to simplify the explanation, it is assumed that the mobile shop vehicle 100 functions as one shop. However, one mobile shop vehicle 100 may function as a plurality of shops. The information, which represents the shop group, includes the information that represents one or more shop or shops which appeal(s) to the target, for example, a combination of shops which may be highly possibly utilized by the target. If the target is further subdivided into a plurality of users, one or more shop or shops, which appeal(s) to the respective users, is/are included. In this case, it is not prohibited that the shop, which appeals to the target, is overlapped between the users.

Figure 7:
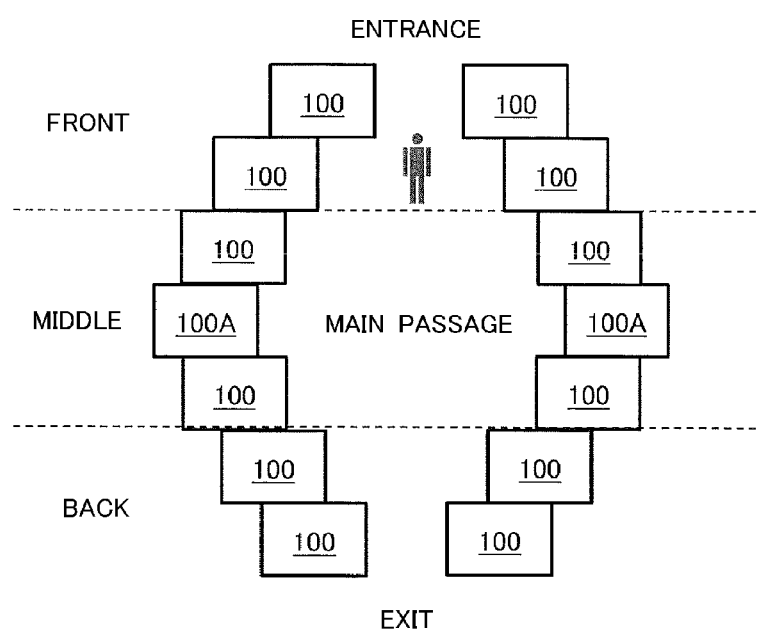
FIG. 7 shows an exemplary overall shape of a shop group.

The overall shape indicates the shape obtained when the shop group, which is formed by the plurality of mobile shop vehicles 100 arranged at the business site 12 (allowed to stop at the designated stopping places respectively), is viewed in a plan view. FIG. 7 shows an exemplary overall shape of the shop group. In the example shown in FIG. 7, the plurality of mobile shop vehicles 100 are arranged along an arc of a circle or an ellipse. An entrance and an exit are provided on the upper side and the lower side of the paper surface of FIG. 7 respectively. A space, which is interposed between rows of the mobile shop vehicle 100, is a main passage.

In the case of the overall shape shown in FIG. 7, such a state is given that almost all of the shops can be surveyed at a position at which the user enters the passage a little from the entrance. It is possible to give a lively impression to the user. If the target prefers the liveliness, it is possible to adopt the overall shape as described above. Note that the mobile non-shop vehicles 100A (for example, toilet) are arranged at deep positions as viewed from the main passage disposed at the middle.

Figure 8:
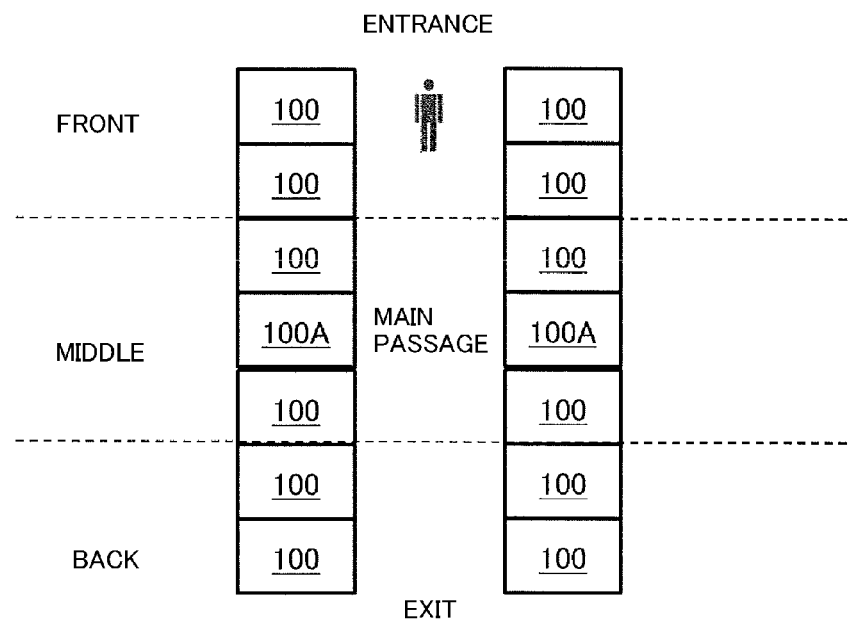
FIG. 8 shows another exemplary overall shape of a shop group.

FIG. 8 shows another exemplary overall shape of the shop group. As shown in FIG. 8, the shop group is arranged in a form of two rows of parallel straight lines, and thus it is possible to give an orderly impression to the user. If the target prefers the orderliness as compared with the liveliness, it is possible to adopt the overall shape as described above. FIGS. 7 and 8 merely depict the examples. It is possible to appropriately adopt any overall shape other than the above. It is also allowable that a single mobile shop vehicle 100 or a plurality of mobile shop vehicles 100 is/are arranged around the arrangement of the mobile shop vehicles 100 shown in FIGS. 7 and 8 (see FIG. 13).

In this way, the overall shape can be selected and changed, for example, depending on the taste of the user (target). Further, it is conceived that the direction (orientation) is changed while maintaining the overall shape as it is, and/or a part of the shape is changed, in accordance with the weather condition (for example, the wind direction) depending on the season of the business site 12. For example, it is conceived that the mobile shop vehicle 100 is arranged at the exit portion as shown in FIGS. 7 and 8 to close the exist so that no wind passes in the winter.

The shop group, which is formed by the mobile shop vehicles 100 and the mobile non-shop vehicles 100A as shown in FIGS. 7 and 8, can be divided into two or more small areas (referred to as "arrangement areas"). In the examples shown in FIGS. 7 and 8, the shop group is classified into the arrangement areas of "front", "middle", and "back" in the direction directed from the entrance to the exit. However, the number of classifications is arbitrary. Assuming that the entrance is disposed at the north, the arrangement areas may be divided into those of the east and the west by using the main passage as the boundary, or the arrangement areas may be divided into four, i.e., the northwest, the northeast, the southwest, and the southeast. The information, which represents the overall shape shown in the first table T1, includes the information which represents the individual designated stopping positions.

The second table T2 stores the information which represents the correspondence between the arrangement area and the attribute possessed by the user as the target, and the shop type and the shop attribute corresponding to the taste and the purchase history. The attribute may be anyone including, for example, the distinction of sex, the age, the hobby, the place of employment, and the place of school attendance for which any correlation can be found with respect to the arrangement area and/or the designated stopping position. In the example shown in FIG. 5, the information is exemplified, which indicates the correspondence between the attribute and the arrangement area in relation to the target "aged" and the shop type and the shop attribute corresponding to the taste and the purchase history. Another second table T2, which has different storage contents, is prepared for other targets.

Figure 9:
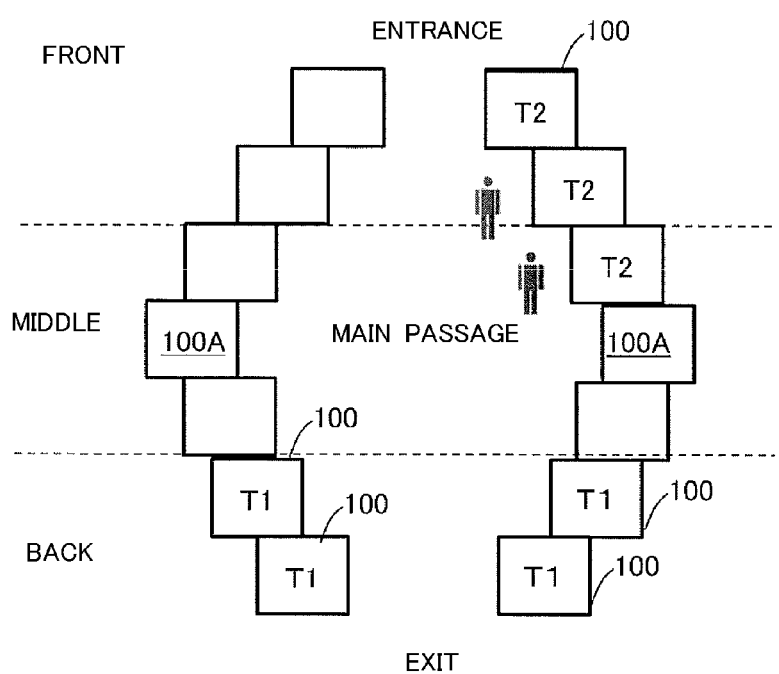
FIG. 9 shows an exemplary arrangement of shops directed to a target.

In the example of the second table T2 shown in FIG. 5, the attribute has the divided segments of the distinction of sex "male", the distinction of sex "female", the age brackets of "sixty-five to seventy-five" and "not less than seventy-five". The second table T2 stores the arrangement areas corresponding to the segments. For example, in relation to the examples of the shop group shown in FIGS. 7 and 8, it is assumed that a knowledge has been obtained such that the aged woman looks around almost all of the shops irrelevant to the purchase and the utilization of the service. In this case, as shown in FIG. 9, the shops, which have the target of aged woman, are arranged in the back arrangement area. The mobile shop vehicles 100, which are affixed with "T1" as shown in FIG. 9, are the shops which have the target of the aged woman. By using the arrangement as described above, it is expected that the target woman may perform any incidental shopping on the way to go to or go back from the shopping at the objective shop.

On the contrary, it is assumed that a knowledge has been obtained such that the aged man goes to the objective shop and goes home without stopping at any other shop after completing the shopping at the objective shop. In this case, as shown in FIG. 9, the shops, which have the target of the aged man, are arranged in the front arrangement area. The mobile shop vehicles 100, which are affixed with "T2" as shown in FIG. 9, are the shops which have the target of the aged man. Accordingly, it is possible to control the traffic line of the man as the target (movement route of the man). The man goes back after finishing the shopping in the vicinity of the entrance, and thus it is expected to mitigate the crowding at the main passage. Further, as shown in FIG. 9, the shops "T2", for which the man is the target, are gathered (concentrated) on the right side (east side) as viewed in FIG. 9, and thus it is possible to further decrease the traffic line of the man. Accordingly, a mental image is formed for the aged man such that all necessary things can be obtained without meandering or moving about. It is possible to facilitate the utilization of the shopping mall (improve the ability to attract customers).

In the example described above, such a case is exemplified that the arrangement area is stored corresponding to the attribute. However, the designated stopping position may be stored in place of the arrangement area, and the designated stopping position may be determined depending on the attribute. Further, the arrangement area and/or the designated stopping place may be stored while corresponding to the information which represents the taste and/or the purchase history.

The second table T2 stores, as the information concerning the taste, the information (either singular or plural) which represents the type of the shop, and the information which represents the attribute of the shop corresponding to the taste of the user for every type of the shop. The information, which represents the attribute of the shop, may be anyone provided that the information resides in the parameter which is used as the basis when the user selects the shop, including, for example, the atmosphere of the shop (for example, lively or orderly), the distinction of sex and the age bracket of the clerk, and the price range of the merchandise. Accordingly, the attribute of the shop, which corresponds to the target in relation to the type of the shop, can be read from the second table on the basis of the information which represents the type of the shop included in the information which represents the shop construction of the first table T1.

Further, the second table T2 stores, as the information concerning the purchase history, the purchase history of the user as the target (name of the shop (vehicle ID) at which the merchandise is purchased or the service is utilized), the type of the merchandise or the service, the price, the date and time of the purchase or utilization and the like, and the attribute of the shop and the type of the shop having the purchase history. Accordingly, it is possible to obtain the information which represents the attribute of the shop that has the purchase history of the target, the shop being in accord with the information that represents the type of the shop corresponding to the target, included in the information that represents the shop construction of the first table T1.

The third table T3 manages the information concerning the mobile shop vehicles 100 and the mobile non-shop vehicles 100A. The third table T3 stores the information which represents respectively the classification of the vehicle (whether the vehicle is the mobile shop vehicle 100 or the mobile non-shop vehicle 100A), the shop ID, the information which represents the type of the shop, the information which represents the attribute of the shop, the overall rank order of the shop (ranking of, for example, the degree of popularity and the sales volume directed to all of the shop types), the rank order as classified by the type of the shop (classification) (ranking of, for example, the degree of popularity and the sales volume directed to the type of the shop to which the shop belongs), the evaluation score with respect to the shop, and the number of word-of-mouth communications with respect to the shop (word-of-mouth communications corresponding to the evaluation scores of not less than a predetermined value) while being correlated with the vehicle ID (vehicle identifier). Series of the vehicle ID's and the shop ID's, which are different between the mobile shop vehicles 100 and the mobile non-shop vehicles 100A, are used. However, the vehicle ID's and the shop ID's may be common provided that the respective vehicles can be distinguished. Further, when the vehicle ID and the shop ID are managed one-to-one, the vehicle ID and the shop ID may be commonly used.

Exemplary Operation

An explanation will be made below about exemplary operations of the server apparatus 200 and the mobile shop vehicle 100 (mobile non-shop vehicle 100A) respectively for constructing the control system for the mobile shop vehicles.

Exemplary Operation of Server Apparatus

Figure 10:
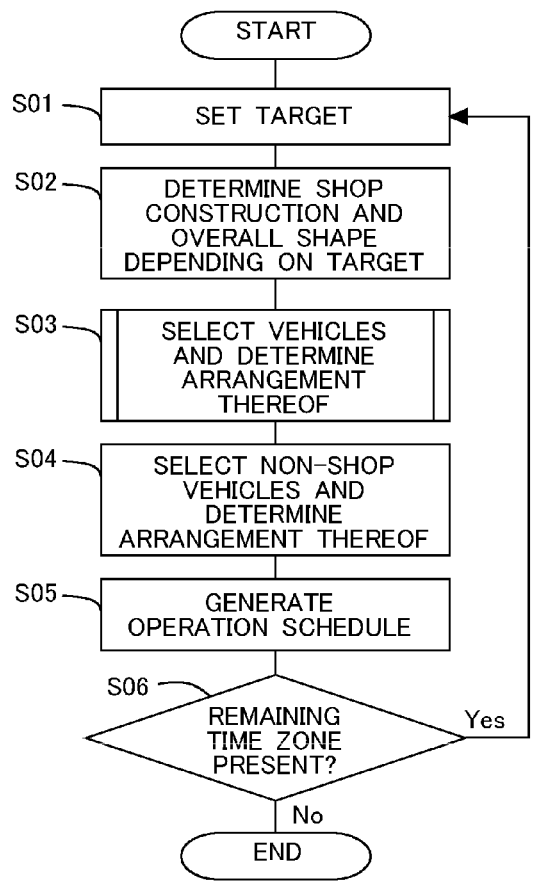
FIG. 10 shows a flow chart illustrating an exemplary operation of the server apparatus.
Figure 11:
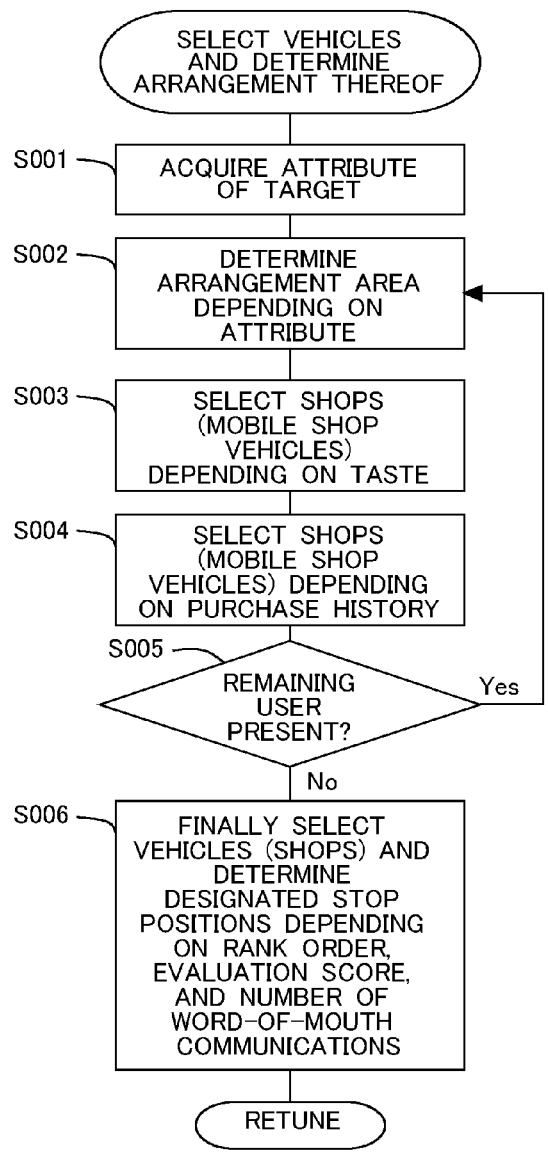
FIG. 11 shows a flow chart illustrating an exemplary process of vehicle selection and arrangement determination thereof.

FIG. 10 shows a flow chart illustrating an exemplary operation of the server apparatus 200 (exemplary process concerning arrangement of mobile shop vehicles). FIG. 11 shows a flow chart illustrating an exemplary process of vehicle selection and arrangement determination thereof (subroutine) for the vehicle shown in FIG. 10.

The process shown in FIG. 10 is executed when the mobile shop vehicle 100 and the mobile non-shop vehicle 100A are not operated (when they stop at the base 11), for example, in the middle of the night. However, the execution at any time other than the above is not limited.

In S01, the controller 202 operates as the user setting unit 213 to set the target. That is, the memory for constructing the controller 202 stores the information which indicates the present season and the day of the week. The user setting unit 213 acquires the information which indicates the season and the day of the week, and the user setting unit 213 extracts the records corresponding to the information from the first table T1. Accordingly, the records concerning a plurality of time zones, which correspond to the season and the day of the week, are obtained. The user setting unit 213 sets the target (for example, aged) correlated with the time zone in relation to the record of the first time zone (for example, forenoon) of the plurality of time zones. The setting of the target means the setting of the user as the appeal target.

In S02, the controller 202 operates as the arrangement determining unit 214, wherein the information which indicates the shop construction corresponding to the target "aged" set in S01 and the information which indicates the overall shape are read from the first table T1 to determine the shop construction and the overall shape applied to the time zone "forenoon".

In S03, the arrangement determining unit 214 executes the process for selecting the vehicles and determining the arrangement thereof. That is, in S001 shown in FIG. 11, the arrangement determining unit 214 makes reference to the second table T2 to acquire the information which represents the attribute corresponding to the target "aged" set in S01. As for the user belonging to the target "aged", the respective records are obtained with respect to the user of "man of sixty-five to seventy-five", the user of "man of not less than seventy-five", the user of "woman of sixty-five to seventy-five", and the user of "woman of not less than seventy-five". The arrangement determining unit 214 performs the following process in relation to the records of the respective users.

For example, the following process is performed for the user of "man of sixty-five to seventy-five" by way of example. The arrangement determining unit 214 determines the arrangement area corresponding to the user of "man of sixty-five to seventy-five" to be the arrangement area in which the shops directed to the concerning user are arranged, in relation to the records acquired from the second table T2 relevant to the user of "man of sixty-five to seventy-five" (S002). In this embodiment, the arrangement determining unit 214 determines the arrangement area for the user of "man of sixty-five to seventy-five" to be "front" (see FIG. 9).

In S003, the arrangement determining unit 214 selects the shops (mobile shop vehicles 100) corresponding to the taste. That is, the arrangement determining unit 214 makes reference to the third table T3 and reads, as the records of the shop candidates from the third table T3, the records of the mobile shop vehicles 100 which are in accord with the information that represents the shop type and the shop attribute corresponding to the taste, of the records corresponding to the user of "man of sixty-five to seventy-five" acquired in S001.

In S004, the arrangement determining unit 214 selects the shops (mobile shop vehicles 100) corresponding to the purchase history. That is, the arrangement determining unit 214 makes reference to the third table T3 and reads, as the records of the shop candidates from the third table T3, the records of the mobile shop vehicles 100 which are in accord with the information that represents the shop attribute corresponding to the purchase history, of the records corresponding to the user of "man of sixty-five to seventy-five" acquired in S001.

In S005, the arrangement determining unit 214 judges whether or not any remaining user is present. If any remaining user is present, the process returns to S002. If any remaining user is not present, the process proceeds to S006. In this embodiment, the arrangement determining unit 214 performs the processes of S002, S003, and S004 in relation to the records with respect to the remaining users of "man of not less than seventy-five", "woman of sixty-five to seventy-five", and "woman of not less than seventy-five". After that, the process proceeds to S006.

In S006, the arrangement determining unit 214 determines the mobile shop vehicles 100 to be included in the shop group and the designated stop positions thereof, on the basis of the records of the mobile shop vehicles 100 read from the third table T3 and the information which represents the shop construction read from the first table T1.

For example, the arrangement determining unit 214 judges whether or not the number of shops of every shop type for forming the shop group is a constant respectively in the information which represents the shop construction. For example, it is assumed that the number of shops belonging to the shop type "food" is three in the information which represent the shop construction. In relation thereto, it is assumed that five records are read from the third table T3, in relation to the shops (mobile shop vehicles 100) belonging to the shop type "food".

In this case, the priority (order of priority) is determined by using at least one of the overall rank order, the classification rank order, the evaluation score, and the number of word-of-mouth communications corresponding to the five mobile shop vehicles 100. The three mobile shop vehicles 100 having higher ranks as counted from the top are selected as the mobile shop vehicles 100 corresponding to the shop type "food" in accordance with the priority. In this embodiment, the composite score (total count) is calculated in relation to the overall rank order, the classification rank order, the evaluation score, and the number of word-of-mouth communications, and the priority is determined in an order starting from those having high composite scores.

However, the overall rank order, the classification rank order, the evaluation score, and the number of word-of-mouth communications may be weighted. Further, the priority may be affixed to each of them, and only the parameters, which have higher ranks as counted from the top until arrival at a predetermined rank order, may be used. At least one of the overall rank order, the classification rank order, the evaluation score, and the number of word-of-mouth communications may be selected and used.

Further, the information, which represents the shop construction, includes the information which represents the designated arrangement positions of the mobile shop vehicles 100 or the mobile non-shop vehicles 100A in relation to the arrangement areas "front", "middle", and "back" respectively. The arrangement determining unit 214 allots, for example, the designated stop positions belonging to the arrangement area "back" to the mobile shop vehicles 100 corresponding to the selected shop type "food" respectively. Accordingly, the final arrangement of the mobile shop vehicles 100 is determined.

For example, three of a plurality of designated stop positions belonging to the arrangement area "back" are secured for allotting the mobile shop vehicles 100 corresponding to the shop type "food", and the allotment order is also determined beforehand. The allotment order can be appropriately set. The arrangement determining unit 214 allots the mobile shop vehicles 100 in the allotment order in accordance with the priorities.

However, any method other than the above may be applied to the method for allotting the mobile shop vehicles 100 to the designated stop positions. For example, the designated stop positions may be allotted so that those having higher priorities in the order are arranged at the back. If S006 is terminated, the process proceeds to S04.

In S04, the non-shop vehicles (the mobile non-shop vehicles 100A) are selected, and the arrangement thereof is determined. The information, which represents the shop construction, includes the information which represents the type (toilet) and the necessary number of the required mobile non-shop vehicles 100A and the designated arrangement positions of the respective mobile non-shop vehicles 100A. The arrangement determining unit 214 reads the records of the required mobile non-shop vehicles 100A from the third table T3 on the basis of the information described above to allot the required mobile non-shop vehicles 100A to the designated stop positions. Thus, the arrangement determining unit 214 determines the arrangement of the mobile non-shop vehicles 100A.

In S05, the controller 202 operates as the schedule generating unit 215 to generate the operation schedule for the mobile shop vehicles 100 and the mobile non-shop vehicles 100A respectively. The information, which represents the generated operation schedule, is stored in the memory of the controller 202, and the information is used to generate the operation commands by the operation command generating unit 212. The operation commands are appropriately supplied to the mobile shop vehicles 100 and the mobile non-shop vehicles 100A respectively via the communication unit 201 and the network 1.

In S06, the controller 202 judges whether or not any remaining time zone is present. If any remaining time zone is present, the process returns to S01. In this embodiment, the processes of S01 to S05 are performed for the remaining time zones "midday", "afternoon", and "night". If the processes for all of the time zones of one day are completed, the process shown in FIG. 10 is terminated. Note that in S01 to S05 in the second-round and the followings, the processes may be performed in the same manner as in the first-round. However, the processes may be executed for any difference from the shop construction in the previous time zone (mobile shop vehicle(s) 100 and/or mobile non-shop vehicle(s) 100A to be added or changed).

Exemplary Operation of Mobile Shop Vehicle 100 (Mobile Non-Shop Vehicle 100A)

Figure 12:
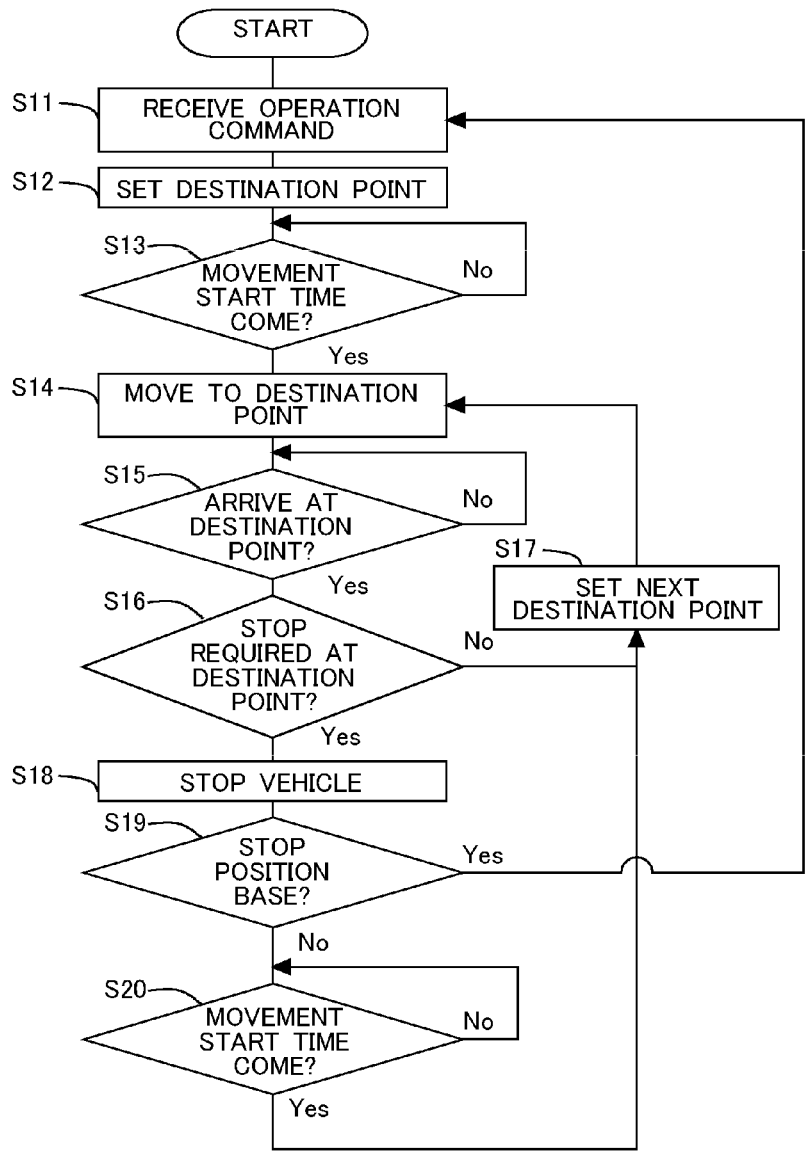
FIG. 12 shows a flow chart illustrating an exemplary operation of the mobile shop vehicle (mobile non-shop vehicle).

FIG. 12 shows a flow chart illustrating an exemplary operation of the mobile shop vehicle 100 (mobile non-shop vehicle 100A). The process shown in FIG. 12 is principally performed by the control unit 103 which operates as the operation plan generating unit 1031, the environment detecting unit 1032, and the traveling control unit 1033.

In S11, the control unit 103 receives the operation commands based on the operation schedule. For example, it is assumed that the control unit 103 receives the supply of the operation commands for one day. However, as for the operation commands, for example, the next operation command may be requested to the server apparatus 200 when the vehicle arrives at the destination point. Alternatively, the control unit 103 itself may generate the operation command by obtaining the operation schedule information from the server apparatus 200.

In S12, if the control unit 103 receives the operation command, the control unit 103 sets the destination point on the basis of the information about the proximate destination point included in the operation command. After that, the control unit 103 waits for the movement start time of the mobile shop vehicle 100 in S13. When the movement start time comes, the control unit 103 controls the driving unit 104 by using the information supplied from the sensor 101 and/or the position information acquiring unit 102 to start the movement of the mobile shop vehicle 100 to the destination point in S14.

In S15, the control unit 103 judges whether or not the vehicle arrives at the destination point. If it is judged that the vehicle arrives at the destination point, the control unit 103 judges whether or not the stop is required at the destination point in S16. If the stop is not required, then the control unit 103 sets the next destination point in accordance with the operation command to go to the next destination point (S17), and the movement is started toward the destination point (S14).

On the contrary, if it is judged that the stop is required at the destination point, then the stop position, at which the safety can be secured and the traffic is not disturbed, is autonomously determined, and the stop at the destination point is controlled (S18). However, if the destination point is the business site, the vehicle is allowed to stop in the designated direction at the designated stop position. The designated stop position and the direction are included in the operation command in which the destination point is the business site 12. With the mobile shop vehicle 100 which stops at the business site 12 (designated stop position), the business is performed by using the shop function.

The information, which indicates the stop position in the base 11, is stored in the memory which constitutes the control unit 103. The mobile shop vehicle 100 judges whether or not the stop position is the stop position in the base 11 (S19). If the stop position is located in the base 11, such a state is given that the control unit 103 waits for the receiving of the operation command in the base 11 (S11). On the contrary, if the stop position is located outside the base 11, the control unit 103 waits for the next movement start time (S20). After that, if the movement start time comes, then the setting is performed to go to the next destination point (S17), and the vehicle moves toward the next destination point (S14).

Exemplary Operations

Next, an explanation will be made about exemplary operations of the shopping mall based on the use of the control system for the mobile shop vehicles.

First Exemplary Operation

The mobile shop vehicles 100 and the mobile non-shop vehicles 100A receive the operation commands from the server apparatus 200 when they stop in the base 11. The mobile shop vehicles 100 and the mobile non-shop vehicles 100A move to the business site 12 when the movement start time comes, and they stop at the designated stop positions. In this case, the mobile shop vehicles 100 and the mobile non-shop vehicles 100A, which form the shop group, are arranged in accordance with the shop arrangement in which the "aged" is the target (FIG. 9). With the shop arrangement as described above, the business in "forenoon" is performed. As the time approaches "midday", the mobile shop vehicles 100, which provide lunches (midday meals), which sell box lunches, and which sell takeout food and drink, depart the base 11.

As the time approaches the time zone "midday", some of the shops including the mobile shop vehicles 100 having the target of the "aged" terminate the business and they withdraw (leave the business site 12). In place thereof, the mobile shop vehicles 100, which provide lunches, box lunches, and takeout food and drink, stop at the designated stop positions of the withdrawn mobile shop vehicles 100, and they start the business.

Figure 13:
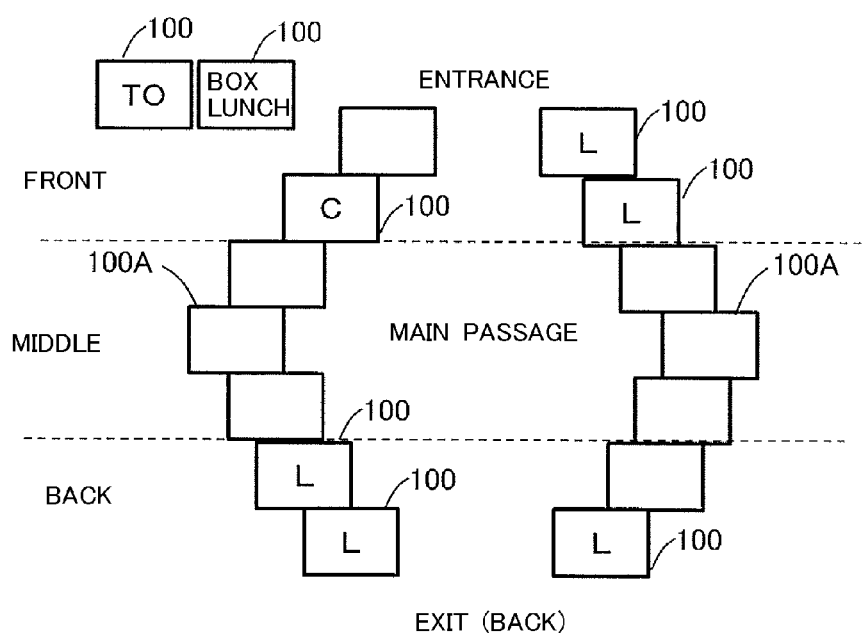
FIG. 13 shows an exemplary shop construction in a time zone "midday".

FIG. 13 shows an exemplary shop construction in the time zone "midday". There are companies in the neighborhood of the business site 12, in which men and women of twenties to thirties work. In the time zone of "midday", the men and women visit the shopping mall in order to get lunches.

In FIG. 13, the mobile shop vehicle 100, to which the letters of "TO" are affixed, is the mobile shop vehicle 100 which provides takeout food and drink. The mobile shop vehicle 100, to which the letters of "box lunch" are affixed, is the mobile shop vehicle 100 which functions as a box lunch shop. Further, the mobile shop vehicles 100, to which the letter of "L" is affixed, are the mobile shop vehicles 100 which function as shops for providing lunches. As shown in FIG. 13, the mobile shop vehicles 100, which have stopped at the designated stop positions in the previous time zone, are replaced with the different mobile shop vehicles 100 in accordance with the change of the time zone. Further, the designated stop positions, which have been absent in the previous time zone, are added, and the shops which are directed to the target in the present time zone (mobile shop vehicles 100 which function as the shop for providing takeout food and drink and the box lunch shop) are arranged at the added designated stop positions.

The shop for providing takeout food and drink and the box lunch shop, which are arranged in the vicinity of the entrance, are the shops directed to men. The mobile shop vehicles 100, which provide lunches that appeal to women, are arranged in the arrangement area "back", while expecting the shopping after the meal by women. In another viewpoint, in the time zone "afternoon", the vehicle is replaced with the mobile shop vehicle 100 which functions as a shop for dealing with children's products (mobile shop vehicle 100 affixed with "C"), the mobile shop vehicle 100 being directed to women who visit the shopping mall accompanied by little children or school children.

Figure 14:
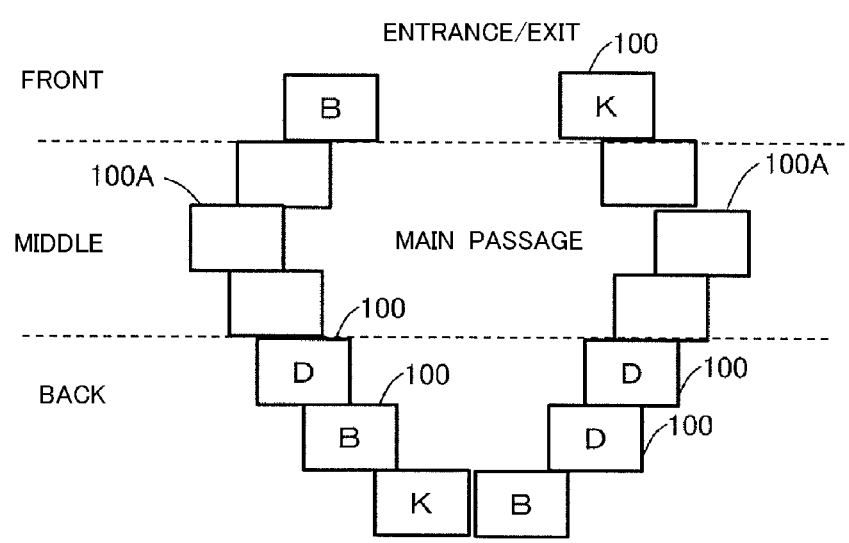
FIG. 14 shows an exemplary shop construction in a time zone "night".

FIG. 14 shows an exemplary shop construction in the time zone "night". The mobile shop vehicles 100, which have stopped in the arrangement area "front", move to the base 11 after terminating the business. In place thereof, the mobile shop vehicles 100 are arranged, which function as eating houses for providing dinners (suppers) and alcohols (for example, restaurant, diner, ramen restaurant, bar, pub, and izakaya (Japanese-style bar)).

In the example shown in FIG. 14, the bar (mobile shop vehicle 100 affixed with "B") and the karaoke store (mobile shop vehicle 100 affixed with "K") are arranged in the arrangement area "front". Further, in the arrangement area "back", the vehicles are replaced with the mobile shop vehicles 100 which function as the eating houses for providing dinners (suppers) (mobile shop vehicles 100 affixed with "D") and the mobile shop vehicles 100 which function as the bars. Further, two designated stop positions are set at the deepest portions of the arrangement area "back", where the mobile shop vehicles 100 are arranged to close the exit. The entrance, which is disposed on the front side, is changed to serve as the exit as well. On account of the business at night, the range, in which the users can enter/exit, is narrowed for the purpose of crime prevention. As described above, the arrangement is changed depending on the time zone, and the number of inlet(s)/outlet(s) is changed. Thus, it is possible to obtain the desired traffic line.

Exemplary Operation 2

The mobile non-shop vehicles 100A are dealt with in the same manner as the mobile shop vehicles 100 such that the designated arrangement positions are determined in relation to the shop construction, and the mobile non-shop vehicles 100A of the predetermined classifications autonomously move and stop at the positions to provide the predetermined functions (for example, toilet, vending machine, first-aid room, and resting room). The position, at which the mobile non-shop vehicle 100A is arranged, is, for example, a position which belongs to a predetermined distance range from any predetermined shop or any place at which the concentration of people is intended.

Figure 15:
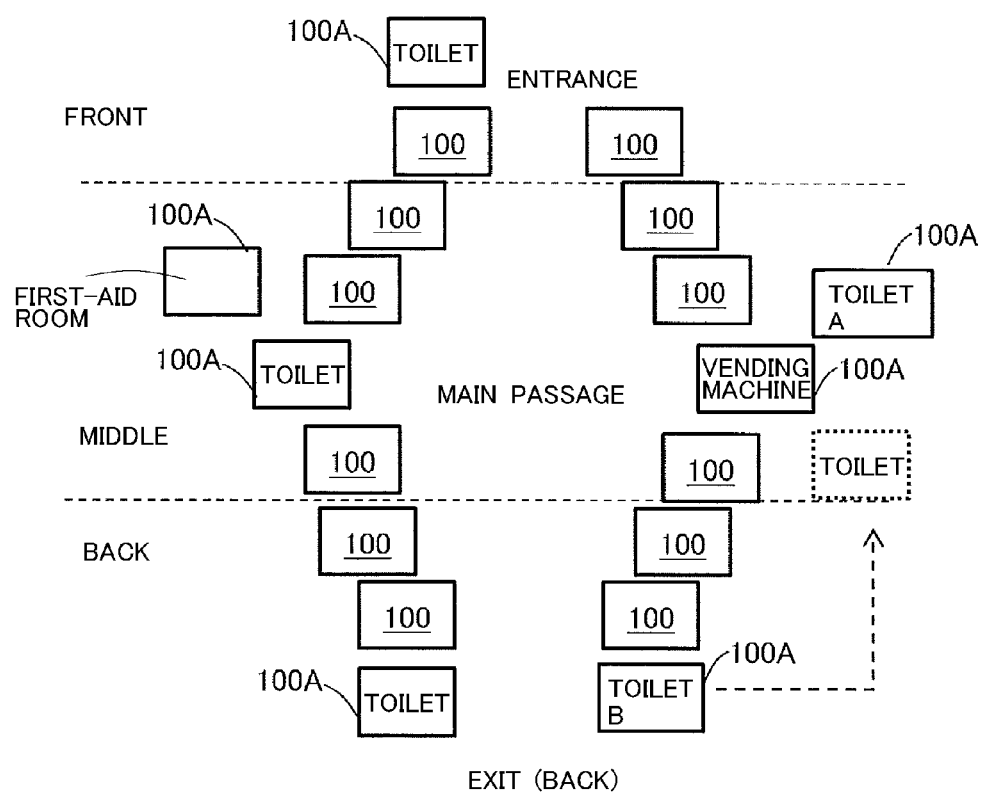
FIG. 15 shows an exemplary arrangement of a plurality of types of mobile non-shop vehicles.

FIG. 15 shows an exemplary arrangement of a plurality of types of mobile non-shop vehicles 100A. The mobile non-shop vehicles 100A, which function as toilets, are arranged in the arrangement areas "front", "middle", and "back" respectively. The mobile non-shop vehicles 100A, which function as a first-aid room and a vending machine, are arranged in the arrangement area "middle". The mobile non-shop vehicles 100A, which function as the toilets, are arranged at the places at which it is anticipated that people gather in a concentrated manner.

Further, if one of the plurality of toilets is crowded, it is conceived that another toilet moves to the vicinity thereof. For example, with reference to FIG. 15, if the toilet A is crowded, and a wailing line is formed, then the toilet B moves to the vicinity of the toilet A, and it is tried to dissolve the waiting line. In this case, the movement of the mobile non-shop vehicle 100A may be either performed on the basis of an operation command supplied from the server apparatus 200 or performed by any manual handling.

The mobile non-shop vehicle 100A, which functions as the first-aid room, can also move to the place at which any person to be subjected to the first-aid appears, if necessary. Also in this case, the movement may be either performed by the autonomous movement based on an operation command supplied from the server apparatus 200 or performed by any manual handling.

Further, it is also conceived that the mobile non-shop vehicle 100A moves while carrying the user to the vicinity of another mobile non-shop vehicle 100A which functions as the toilet. Further, it is also conceived that the mobile non-shop vehicle 100A moves to a predetermined position or a position desired by the user during the period in which the user uses the toilet.

Exemplary Operation 3

It is conceived that a plurality of mobile shop vehicles 100 are arranged adjacently to one another, and internal spaces of the mutually adjoining mobile shop vehicles are in a communicated state to expand the shop space. As for the portions at which the mobile shop vehicles are communicated with each other, the portions may be either connected without any gap by the shape machining or profiling, or any roof and/or any wall may be provided, if necessary.

Figure 16:
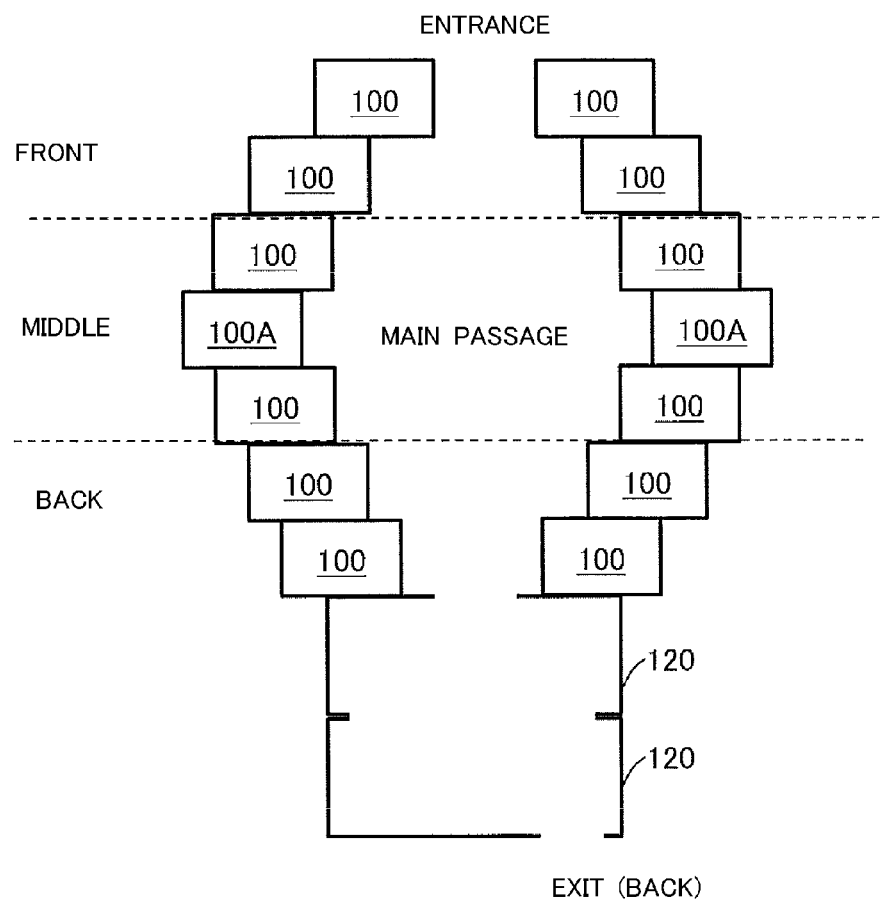
FIG. 16 shows an exemplary expansion of the shop space based on the use of a plurality of mobile shop vehicles.

FIG. 16 shows an exemplary expansion of the shop space based on the use of a plurality of mobile shop vehicles. In the example shown in FIG. 16, two large-sized mobile shop vehicles 120 are arranged adjacently to one another in the arrangement area "back", and the internal spaces of the both are in a communicated state to form an extensive shop space. FIG. 16 exemplifies the connection in the plane. However, the mobile shop vehicles 100 and/or the mobile shop vehicles 120 may be overlapped in the upward-downward direction to form an internal space.

Further, it is conceived that the internal space of the mobile shop vehicle 120 is utilized as follows in addition to the utilization as the place for providing merchandises and services. For example, the inner side of the outer wall of the mobile shop vehicle 120 is formed by a sound-proof wall, and/or a silencing speaker is utilized so that the internal space of the mobile shop vehicle 120 is utilized as any soundproofing facility (place for any event or attraction such as a music hall, a haunted house or the like).

Figure 17:
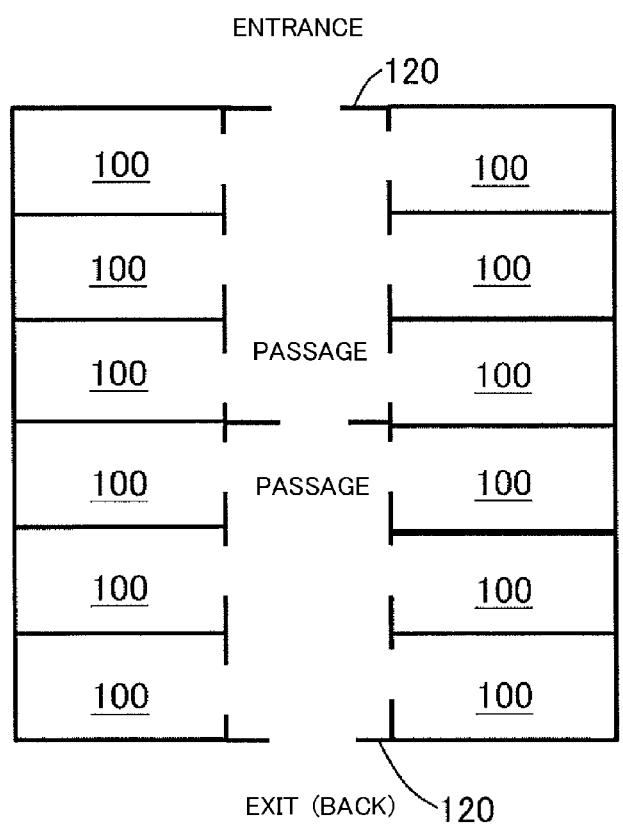
FIG. 17 shows an example in which mobile shop vehicles are used as a passage.

Further, it is conceived that the internal spaces of the mobile shop vehicles 100 are in a communicated state, and they are utilized as a passage for connecting the shops. FIG. 17 shows an example in which mobile shop vehicles are used as a passage. In the example shown in FIG. 17, large-sized mobile shop vehicles 120 are arranged in the longitudinal direction, and the internal spaces between the both are communicated and utilized as the passage. Further, the side surfaces of the mobile shop vehicles 120 are communicated with the internal spaces of the mobile shop vehicles 100, and they are used as entrances/exits from the passage to the shops.

The mobile shop vehicles 100 and the mobile shop vehicles 120 have unillustrated roofs. Therefore, the user can access the respective shops of the mobile shop vehicles 100 by using the internal spaces (passage) of the mobile shop vehicles 120 without being affected by wind and rain. In this case, the air conditioning equipment, which is possessed by one of the plurality of mobile shop vehicles 120, is operated to improve the air conditioning efficiency by circulating the air-conditioned air to another mobile shop vehicle 120. Alternatively, the air-conditioned air may be fed from the respective mobile shop vehicles 100 to the internal spaces of the mobile shop vehicles 120.

Fourth Exemplary Operation

The mobile shop vehicle 100 may function as an advertising car during the movement from the base 11 to the business site 12 and the movement from the business site 12 to the base 11. The contents to be advertised by the mobile shop vehicle 100 are not specifically limited. The contents may be either directly related to the shopping mall or not directly related thereto. For example, it is conceived to advertise, for example, a notice of business hours of the shopping mall, a notice of bargain goods, and a notice of event. Alternatively, it is also conceived that if any place or any facility (for example, bustling street), which can be an advertising objective, is present in the neighborhood of the business site 12 of the mobile shop vehicle 100, the mobile shop vehicle 100 advertises the place or the facility. The contents of the advertisement can be changed depending on the region in which the shopping mall is installed, the inhabitants of the region, and the attribute of the user who utilizes the shopping mall.

The transmission of information concerning the advertisement can be performed, for example, by the sound broadcasting and/or the display on the display. The voice data concerning the advertisement and the image data for displaying the screen can be stored or acquired from any other device or apparatus by the server apparatus 200, and the voice data and the image data can be supplied to the mobile shop vehicles 100 respectively via the network 1. It is also allowable to adopt such a construction that the voice data and the image data are provided by any device or apparatus other than the server apparatus 200.

As for the mobile shop vehicle 100 which has obtained the voice data and the image data, the broadcasting device 106 carried on the subject vehicle (including a voice playback device and a speaker) can output the voice concerning the advertisement by using the voice data, and/or the control unit 103 can perform the display control based on the use of the image data to display the image data on the display 107. The expression of the advertisement may be performed with a banner or a signboard attached to the mobile shop vehicle 100. Further, the exterior of the mobile shop vehicle 100 may be changed for the advertisement.

Owing to the mobile shop vehicle 100 which functions as the advertising car, it is possible to contribute to the sales volume and the customer attraction even in a state in which the mobile shop vehicle 100 does not exhibit the function as the shop.

The movement route of the mobile shop vehicle 100 can be set so that the mobile shop vehicle 100 goes via a single or a plurality of predetermined position(s) (transit point(s)) before arrival at the final destination point (business site 12 or base 11) to which the mobile shop vehicle 100 is directed. Accordingly, it is possible to enhance the effect of advertisement.

Further, when the mobile shop vehicle 100 moves, the mobile shop vehicle 100 may move while carrying cargoes and/or passengers. For example, when the mobile shop vehicle 100 moves from the base 11 to the business site 12, the mobile shop vehicle 100 may go via, for example, the facility (office or business office) concerning the shop management of the mobile shop vehicle 100 to pick up clerks and/or merchandises. Further, the mobile shop vehicle 100 may go to the business site 12 while carrying the users via a predetermined appointment place such as the nearest railroad station, the bus stop and the like. Alternatively, when the mobile shop vehicle 100 moves to the base 11, then the mobile shop vehicle 100 moves to a predetermined place (for example, the nearest railroad station, the bus stop, and the main street on which taxi can be picked up) while carrying shop clerks and/or customers, and/or the mobile shop vehicle 100 may deliver unnecessary items and/or wastes, for example, to the facility concerning the shop management of the mobile shop vehicle 100.

Further, the mobile shop vehicle 100 may stop for a predetermined time at the transit point (for example, any place at which many potential customers of the shopping mall are present, including, for example, parking places of factories and companies). In this case, advertisement leaflets and/or coupons may be distributed to the users. Alternatively, the order for an article on order (for example, box lunch or lunch) may be accepted from the user beforehand so that the article on order can be provided in response to the visit of the user thereafter.

The construction, which relates, for example, to the advertisement during the movement of the mobile shop vehicle 100 explained above, can be also applied to the mobile non-shop vehicle 100A.

Exemplary Operation 5

The business site 12 is determined, for example, on the basis of the population data of the target area of the construction of the shopping mall. For example, the business site 12 is provided at the place at which the users, which are targets in the respective time zones, live to some extent, on the basis of the data which indicates the population distribution of the target area in the respective time zones of "forenoon", "midday", "afternoon", and "night". For example, it is also conceived that a plurality of business sites 12 are provided depending on the targets, including, for example, the neighborhood of a housing estate at which many aged people live in the forenoon, the neighborhood of a factory or a business office in the midday, the neighborhood of a kindergarten or a nursery school in the afternoon, and the neighborhood of a factory or a business office at night. Accordingly, it is possible to provide the shop arrangement depending on the target and the target (user) setting.

Effects of Embodiments

According to the embodiment, the server apparatus 200 sets the user of the shop group for forming the shopping mall, and the server apparatus 200 determines the arrangement of the plurality of mobile shop vehicles 100 on the basis of the information which represents at least one of the attribute of the user, the taste, and the purchase history. In this way, the shop arrangement, which appeals to the target, is provided. Thus, it is possible to provide the adequate shop arrangement with which it is expected to improve the sales volume and the ability to attract customers, and it is possible to respond to the request of the interested party of the shopping mall.

Further, in the embodiment, the arrangement of the plurality of mobile shop vehicles 100 is determined on the basis of the information which represents the reputations of the plurality of mobile shop vehicles 100 (rank order, evaluation value, number of word-of-mouth communications). Accordingly, for example, the shop having the good reputation is preferentially included in the shops, and thus it is possible to obtain the adequate shop arrangement.

Further, in the embodiment, the server apparatus 200 determines the arrangement of the plurality of mobile shop vehicles 100 depending on the predetermined period classification (season, day of the week, and time zone). Accordingly, the shop arrangement is provided corresponding to the period classification which changes at every moment. Thus, it is possible to provide the adequate shop arrangement which follows the change of the target caused by the change of period classification.

Further, in the embodiment, the server apparatus 200 determines the arrangement of at least one mobile non-shop vehicle 100A to be arranged together with the plurality of mobile shop vehicles 100 for forming the shop group. Accordingly, it is possible to provide the better shop arrangement owing to the proper arrangement of the accompanying facility other than the shop.

Further, in the embodiment, the server apparatus 200 generates the movement control information for the plurality of mobile shop vehicles 100 respectively in accordance with the arrangement of the plurality of mobile shop vehicles 100, and the server apparatus 200 supplies the movement control information to the plurality of mobile shop vehicles respectively. Accordingly, it is possible to automatically perform the construction of the autonomous shop arrangement by controlling the autonomous movement of the mobile shop vehicles.

Other Embodiments

The embodiments described above are referred to by way of example in every sense. The present disclosure can be carried out while being appropriately changed within a scope without deviating from the gist or characteristics of the present disclosure. For example, the process, which has been explained as performed by one device or apparatus, may be executed while being shared by a plurality of devices or apparatuses. Further, it is also allowable that the processes, which have been explained as performed by different devices or apparatuses, are executed by one device or apparatus. In the computer system, by what kind of the hardware configuration (server configuration) the respective functions are to be realized can be flexibly changed.

What is claimed is:

1. An apparatus for determining arrangement of mobile shop vehicles, comprising a controller configured to:
   set a user as an appeal target of a shop group formed by the plurality of mobile shop vehicles and determine an overall arrangement shape of the plurality of mobile shop vehicles based on a present season, a present day of the week, and a data table that correlates a season and a day of the week to the appeal target and the overall arrangement shape; and
   determine the arrangement of the plurality of mobile shop vehicles on the basis of information that represents at least one of an attribute, a taste, and a purchase history of the user, the arrangement of the plurality of mobile shop vehicles includes the overall arrangement shape of the plurality of mobile shop vehicles for forming the shop group and relative positions of individual mobile shop vehicles in the overall arrangement shape; and
   arrange the plurality of mobile shop vehicles.

2. The apparatus for determining the arrangement of the mobile shop vehicles according to claim 1, wherein the controller is further configured to determine the arrangement of the plurality of mobile shop vehicles on the basis of information that represents a reputation concerning the plurality of mobile shop vehicles.

3. The apparatus for determining the arrangement of the mobile shop vehicles according to claim 1, wherein the controller is further configured to determine the arrangement of the plurality of mobile shop vehicles depending on a predetermined period classification.

4. The apparatus for determining the arrangement of the mobile shop vehicles according to claim 1, wherein the controller is further configured to determine arrangement of at least one mobile non-shop vehicle to be arranged together with the plurality of mobile shop vehicles for forming the shop group.

5. The apparatus for determining the arrangement of the mobile shop vehicles according to claim 1, further configured to:
   generate movement control information for the plurality of mobile shop vehicles respectively depending on the arrangement of the plurality of mobile shop vehicles; and
   supply the movement control information to the plurality of mobile shop vehicles respectively.

6. A method for determining arrangement of mobile shop vehicles, comprising:
   setting, by a computer, a user as an appeal target of a shop group formed by the plurality of mobile shop vehicles and determining an overall arrangement shape of the plurality of mobile shop vehicles based on a present season, a present day of the week, and a data table that correlates a season and a day of the week to the appeal target and the overall arrangement shape; and
   determining the arrangement of the plurality of mobile shop vehicles on the basis of information that represents at least one of an attribute, a taste, and a purchase history of the user, the arrangement of the plurality of mobile shop vehicles includes the overall arrangement shape of the plurality of mobile shop vehicles for forming the shop group and relative positions of individual mobile shop vehicles in the overall arrangement shape; and
   arranging the plurality of mobile shop vehicles.

7. A non-transitory computer-readable storage medium stored with a program to allow a computer to execute:
   a step of setting a user as an appeal target of a shop group formed by a plurality of mobile shop vehicles and determining an overall arrangement shape of the plurality of mobile shop vehicles based on a present season, a present day of the week, and a data table that correlates a season and a day of the week to the appeal target and the overall arrangement shape; and
   a step of determining the arrangement of the plurality of mobile shop vehicles on the basis of information that represents at least one of an attribute, a taste, and a purchase history of the user, the arrangement of the mobile shop vehicles includes the overall arrangement shape of the plurality of mobile shop vehicles for forming the shop group and relative positions of individual mobile shop vehicles in the overall arrangement shape; and
   a step of arranging the plurality of mobile shop vehicles.

* * * * *